M. S. CLARK.
BRAKE FOR FIRE-TRUCK.
No. 181,643.                                      Patented Aug. 29, 1876.
Fig: 1.
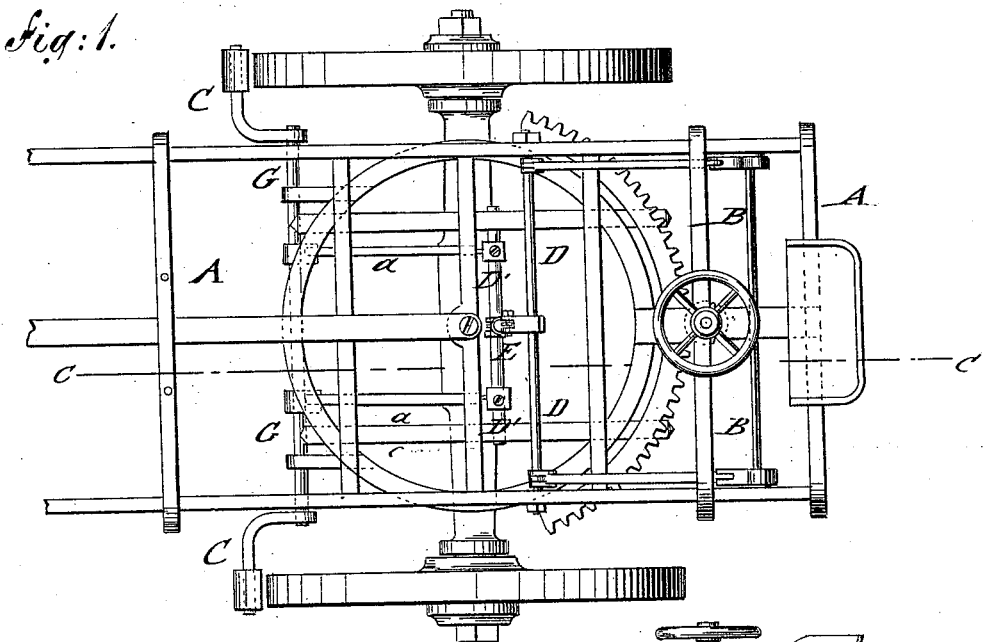
Fig: 2.
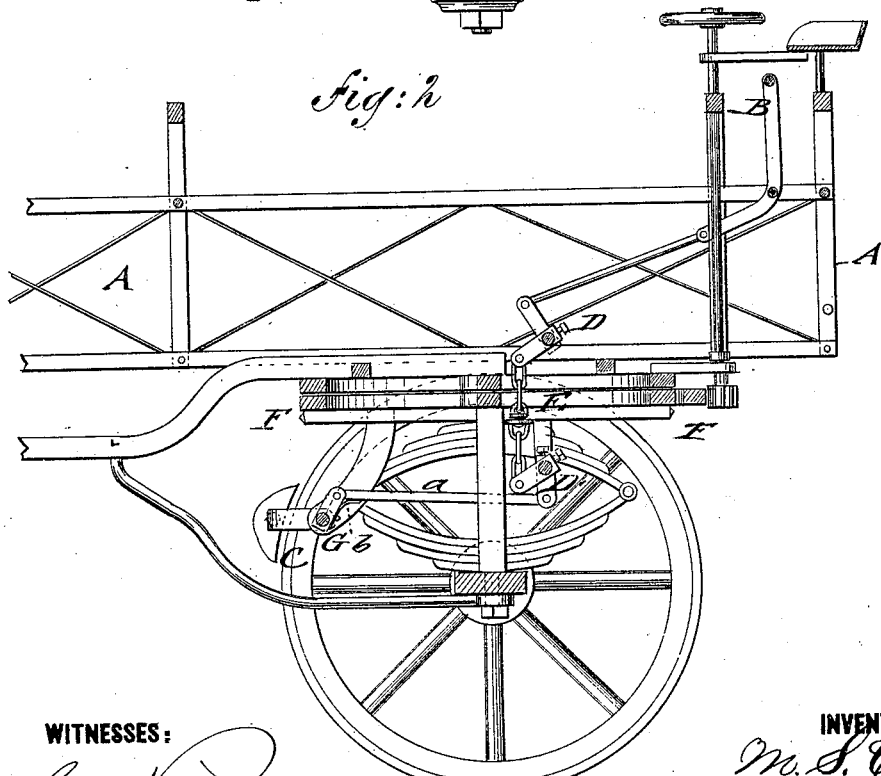
WITNESSES:
INVENTOR:
M. S. Clark
BY
ATTORNEYS.

UNITED STATES PATENT OFFICE.

MINFORD S. CLARK, OF BROOKLYN, NEW YORK.

IMPROVEMENT IN BRAKES FOR FIRE-TRUCKS.

Specification forming part of Letters Patent No. 181,643, dated August 29, 1876; application filed July 31, 1876.

*To all whom it may concern:*

Be it known that I, MINFORD S. CLARK, of Brooklyn, in the county of Kings and State of New York, have invented a new and Improved Brake for Fire-Trucks, of which the following is a specification:

In the accompanying drawing, Figure 1 represents a top view, and Fig. 2 a vertical longitudinal section on the line $c\,c$, Fig. 1, of a fire-truck with my improved brake.

Similar letters of reference indicate corresponding parts.

The invention relates to an improved brake for fire-trucks, that is effectually worked by the attendant at the steering-wheel, and capable of being applied at any position of the fifth or steering wheel of the truck.

The invention consists of a brake mechanism which swings in supporting-arms of the fifth or steering wheel at the hind part of the truck, and is operated by intermediate crank shafts and rods, by a fulcrumed treadle from the seat of the attendant. The motion-transmitting crank-shafts are swung in bearings of the fifth-wheel and of the truck-frame, and connected by a swivel-chain.

In the drawing, A represents a hook-and-ladder truck of the usual construction, which is steered by a hand-wheel, with pinion engaging the toothed fifth-wheel at the hind part of the truck. The truck is steered by an attendant, who is seated at the hind part of the truck. Below the seat, to be worked by the feet of the steersman, is arranged a treadle-rod, B, which, by intermediate connection, operates a swinging brake mechanism, C, which is intended to overcome the difficulty hitherto experienced in steering and guiding this class of trucks.

No brakes have heretofore been used for the hind wheels of hook-and-ladder trucks, so that the controlling of the same in going downhill was difficult and liable to danger and accident.

My brake arrangement is capable of being applied to the wheels in any position of the hind wheels by connecting the fulcrumed treadle B, by suitable lever-rods, first with a crank-shaft, D, swinging in bearings of the truck-frame A, and then, by a central crank-arm and swivel-chain, E, with the center crank of a second crank-shaft, D', that turns in supports of the fifth-wheel F. The crank-arms of shaft D' are then connected, by pivot-rods $a$, with crank-arms of the brake-rod G, which is supported in strong arms of the fifth-wheel. Suitable springs $b$, attached to the crank-arms of the brake-rod, bear on the pivot-rods, and produce the release of the brake-shoes C from the wheels as soon as the operating treadle-rod B is released by the steersman.

As the lower part of the mechanism— namely, brake-rod and lower crank-shaft—is supported on the fifth-wheel, and moved with the same, and as the upper part of the operating mechanism is applied to the truck-frame, the swivel-chain forms the connecting-link of the brake mechanism, and secures, by its adjustability to the relative change of position of fifth-wheel and truck-frame, the positive action of the brake without straining or breaking. The hook-and-ladder truck is thereby more completely kept in hand and accidents avoided.

The ladders can be taken off and put on without disturbing any portion of the brakes.

Having thus described my invention, I claim as new and desire to secure by Letters Patent—

The combination of the fulcrumed treadle and crank-shaft of the truck-frame, by a connecting swivel-chain, with the crank-shaft and spring-acted brake mechanism of the fifth-wheel, substantially in the manner and for the purpose set forth.

MINFORD S. CLARK.

Witnesses:
PAUL GOEPEL,
ALEX. F. ROBERTS.